(No Model.) 2 Sheets—Sheet 1.
T. D. LINES.
THILL COUPLING.
No. 475,509. Patented May 24, 1892.
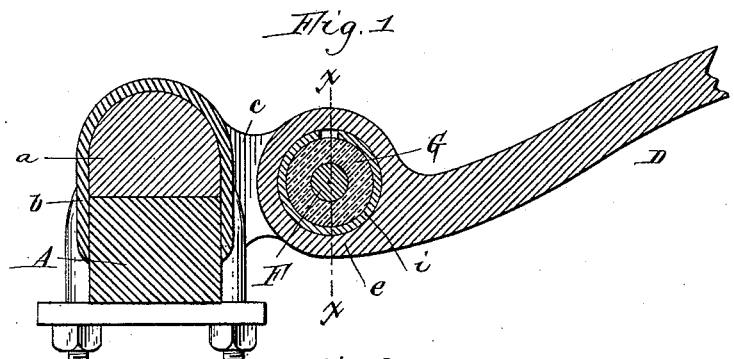
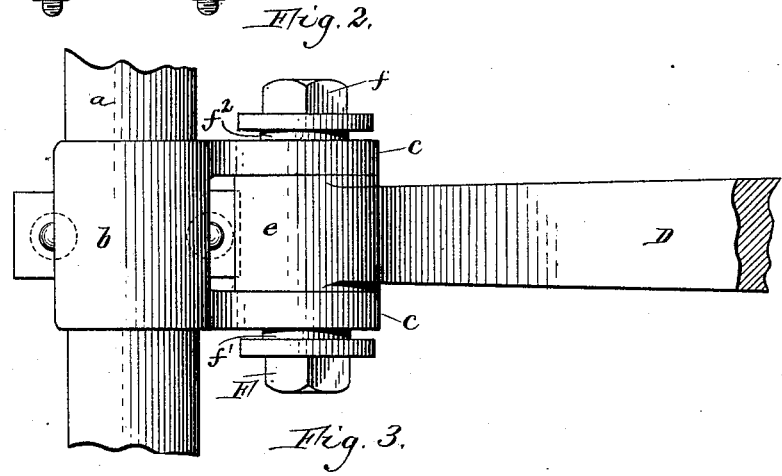
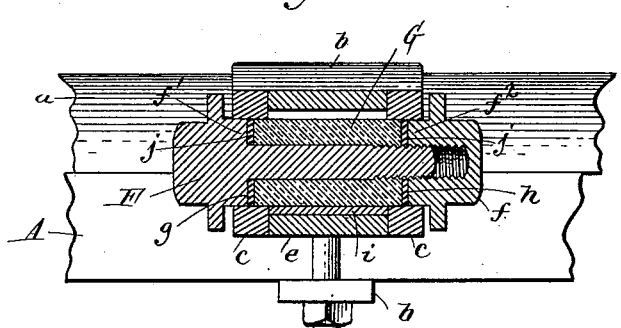
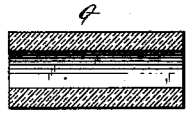
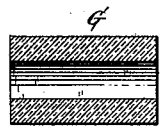
Witnesses:
Theo. L. Popp
Emil Neuhart
Thos. D. Lines Inventor.
By Wilhelm & Bonner
Attorneys (No Model.) 2 Sheets—Sheet 2.
T. D. LINES.
THILL COUPLING.

No. 475,509. Patented May 24, 1892.

Witnesses:
Theo. L. Popp.
John N. Ardner.

Thos. D. Lines, Inventor,
By Wichelm & Bonner,
Attorneys.

UNITED STATES PATENT OFFICE.

THOMAS D. LINES, OF SYRACUSE, NEW YORK, ASSIGNOR TO CHARLES A. DENISON, OF SAME PLACE.

THILL-COUPLING.

SPECIFICATION forming part of Letters Patent No. 475,509, dated May 24, 1892.

Application filed September 26 1891. Serial No. 406,902. (No model.)

*To all whom it may concern:*

Be it known that I, THOMAS D. LINES, a citizen of the United States, residing at Syracuse, in the county of Onondaga and State of New York, have invented a new and useful Improvement in Couplings for Vehicles, of which the following is a specification.

This invention relates to that class of couplings which are used in vehicles for attaching the thills to the axle or for similar purposes and in which a rubber bushing is expanded into an eye, so as to prevent noise.

The object of my invention is to expand the rubber bushing uniformly and effectually into the eye, so as to prevent lost motion and noise and at the same time to permit of a free articulated movement of one of the coupled parts on the other.

Figure 6:
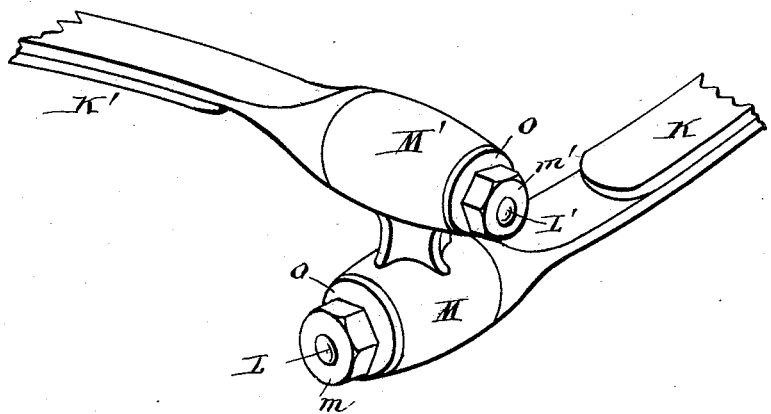
Figure 7:
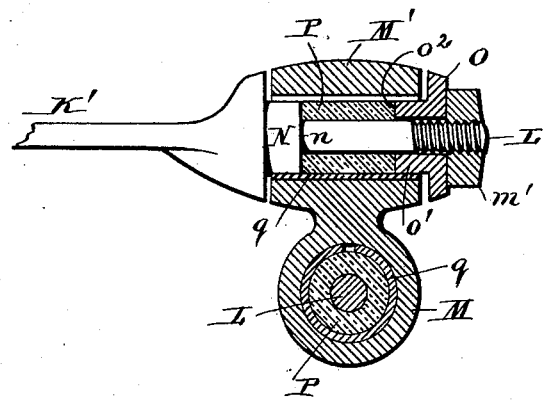

In the accompanying drawings, consisting of two sheets, Figure 1 is a sectional elevation of a thill-coupling embodying my improvements. Fig. 2 is a top plan view thereof. Fig. 3 is a vertical transverse section in line $x\ x$, Fig. 1. Figs. 4 and 5 are sectional views showing the shape of the rubber bushing before and after it is expanded into the eye of the thill-iron. Fig. 6 is a perspective view of a coupling connecting the side and end springs of a vehicle embodying my improvements. Fig. 7 is a fragmentary vertical section thereof.

Like letters of reference refer to like parts in the several figures.

In Figs. 1 to 5, A represents the front axle of a vehicle, and $a$ the wood bed, secured thereto by a clip $b$. The latter is provided with two forwardly-projecting ears or lugs $c\ c$, having transverse perforations. D represents the thill-iron, which is provided with an eye $e$, arranged between the perforated ears of the clip. F represents the connecting-bolt, which passes through the perforated ears and the eye of the thill-iron and is secured in place by a screw-nut $f$. The head of the bolt and its nut are provided with inner cylindrical portions $f'\ f^2$, which fit in the openings of the ears. G represents a cylindrical bushing of rubber which surrounds the shank of the bolt and is arranged in the eye of the thill-iron with its ends projecting into the openings of the ears. The ends of the rubber bushing bear against the inner square shoulders $g\ h$ of the bolt-head and nut. Upon screwing the bolt and its nut together these shoulders exert an endwise pressure upon the rubber block and by compressing it endwise expand it outwardly into the eye of the thill-iron, whereby these parts are tightly forced together and the rattling noise resulting from a loose connection is avoided. A split bushing $i$, of brass or other suitable metal, is preferably interposed between the rubber block and the eye of the thill-iron, so that the rubber is expanded into this bushing, and the latter turns in the eye, whereby the rubber is relieved from wear. Washers $j$ may likewise be placed between the ends of the rubber block and the inner sides of the bolt-head and nut, so as to form smooth bearing-surfaces at both ends, which reduce friction and wear. Any wear of the rubber or the metallic bushing and washers can be easily taken up by simply tightening the nut of the connecting-bolt. The pressure applied to the ends of the rubber bushing causes the latter to bulge out uniformly at its side and adapt itself to the openings of the thill-iron and the clip-ears.

In Figs. 6 and 7, K K' represent the side and end springs, respectively, of the vehicle, which are arranged at right angles to each other. The ends of these springs are provided with coupling-bolts L L', which pass through the eyes M M' of a coupling and are secured therein by nuts $m\ m'$, applied to the screw-threaded outer ends of the coupling-bolts. The eyes M M' are arranged at right angles to each other and are formed in one piece, one above the other. N represents a cylindrical enlargement formed on the inner end of each coupling-bolt, which forms a shoulder $n$ on the bolt. O represents washers interposed between the nuts $m\ m'$ and the outer ends of the eyes M M'. Each of these washers is provided with a cylindrical hub $o'$, which extends into the eye and forms a shoulder $o^2$. P represents cylindrical rubber bushings arranged in the eyes M M' and surrounding the shanks of the bolts. The ends of the bushings bear against the shoulders of the enlargement of the bolt and the hub of the washer. $q$ represents a split brass bushing interposed between the eyes and the rubber bushings. Upon tightening the nuts $m\ m'$ the rubber blocks are expanded into the eyes, thereby taking up all looseness between these parts and preventing rattling.

I claim as my invention—

The combination, with the eye, of a yielding bushing arranged in said eye, a bolt passing through said bushing and having a square shoulder on its head which bears against one end of said bushing, a screw-nut applied to said bolt and having a shoulder which bears against the opposite end of the bushing, and a split metallic bushing interposed between the yielding bushing and the eye, substantially as set forth.

Witness my hand this 1st day of September, 1891.

THOMAS D. LINES.

Witnesses:
THEO. L. POPP,
JENNIE CLOUGH.